US012738881B1

(12) United States Patent
Kapla et al.

(10) Patent No.: US 12,738,881 B1
(45) Date of Patent: Sep. 15, 2026

(54) SYSTEMS AND METHODS FOR MOUNTING SOLAR PANELS

(71) Applicant: Unirac, Inc., Albuquerque, NM (US)

(72) Inventors: John Kapla, San Jose, CA (US); Kyle Feldmann, San Jose, CA (US)

(73) Assignee: Unirac, Inc., Albuquerque, NM (US)

( * ) Notice: Subject to any disclaimer, the term of this patent is extended or adjusted under 35 U.S.C. 154(b) by 0 days.

(21) Appl. No.: 18/159,610

(22) Filed: Jan. 25, 2023

Related U.S. Application Data

(63) Continuation of application No. 15/971,751, filed on May 4, 2018, now Pat. No. 11,594,998.

(60) Provisional application No. 62/526,072, filed on Jun. 28, 2017.

(51) Int. Cl.
*H02S 20/23* (2014.01)
*H02S 30/00* (2014.01)

(52) U.S. Cl.
CPC .............. *H02S 20/23* (2014.12); *H02S 30/00* (2013.01); *Y02B 10/10* (2013.01)

(58) Field of Classification Search
CPC ......... H02S 20/23; H02S 30/00; Y02B 10/10; Y02E 10/50
See application file for complete search history.

(56) References Cited

U.S. PATENT DOCUMENTS 8,039,733 B2 * 10/2011 Kobayashi .............. F24S 25/20 136/251
D674,513 S * 1/2013 Liu .............................. D25/119
9,219,443 B2 12/2015 Shibata
9,863,665 B2 * 1/2018 West ........................ F24S 25/65
9,899,955 B2 2/2018 Tomlinson
2009/0320906 A1 * 12/2009 Botkin .................... H02S 30/10 136/251
2010/0206301 A1 * 8/2010 Aftanas ................... A61P 35/00 248/309.1
2012/0160236 A1 6/2012 Wares
2012/0233940 A1 9/2012 Perkins
2013/0294814 A1 11/2013 Sader
2014/0158184 A1 * 6/2014 West ........................ H02S 20/00 136/251
2014/0366464 A1 12/2014 Rodrigues
2015/0168021 A1 6/2015 Wentworth
2016/0087576 A1 3/2016 Johansen
2017/0040934 A1 * 2/2017 Xie .......................... H02S 20/23
2018/0367088 A1 * 12/2018 Tomlinson .............. H02S 20/00

* cited by examiner

*Primary Examiner* — Omar F Hijaz
(74) *Attorney, Agent, or Firm* — Lee & Hayes, P.C.

(57) ABSTRACT

Mounting a solar panel system includes installing a skirt to a roof in a predetermined position, the predetermined position guiding an alignment for additional components installed in the solar panel system; integrating a solar panel with a flange of the skirt, wherein the skirt supports a portion of the solar panel; determining if a width of the solar panel system will be increased; installing an additional skirt to which an additional solar panel is attached in response to determining that the width of the solar panel system will be increased; determining if a length of the solar panel system will be increased; and integrating an additional solar panel with a flange of a previously installed solar panel via a mount interface in response to determining that the length of the solar panel system will be increased.

16 Claims, 16 Drawing Sheets

200
225
227
230
215
210
205
220

105c
320
305
310
325
300
110
327

430
105b
405
410
425
420
415
400
105c 105a
515
520
510
505
105b 900
910
905c
905a
905b
805c 805c
1000
805b
1005
1010

SYSTEMS AND METHODS FOR MOUNTING SOLAR PANELS

CROSS-REFERENCE TO RELATED APPLICATIONS

This application is a continuation of U.S. patent application Ser. No. 15/971,751 filed May 4, 2018, which claims priority to U.S. Provisional Application No. 62/526,072 filed Jun. 28, 2017. The entire contents of each of which are incorporated herein by reference.

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Solar panels may absorb sunlight as a source of energy to generate electricity and/or heat. With a push toward more environmentally friendly options, the demand for installing solar panels into residential areas is increasing. Particularly with residential areas, cost may be a concern when contemplating installing a solar panel system.

SUMMARY

The foregoing paragraphs have been provided by way of general introduction, and are not intended to limit the scope of the following claims. The described embodiments, together with further advantages, will be best understood by reference to the following detailed description taken in conjunction with the accompanying drawings.

According to embodiments of the disclosed subject matter, mounting a solar panel system includes installing a skirt to a roof in a predetermined position, the predetermined position guiding an alignment for additional components installed in the solar panel system; integrating a solar panel with a flange of the skirt, wherein the skirt supports a portion of the solar panel; determining if a width of the solar panel system will be increased; installing an additional skirt to which an additional solar panel is attached in response to determining that the width of the solar panel system will be increased; determining if a length of the solar panel system will be increased; and integrating an additional solar panel with a flange of a previously installed solar panel via a mount interface in response to determining that the length of the solar panel system will be increased.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
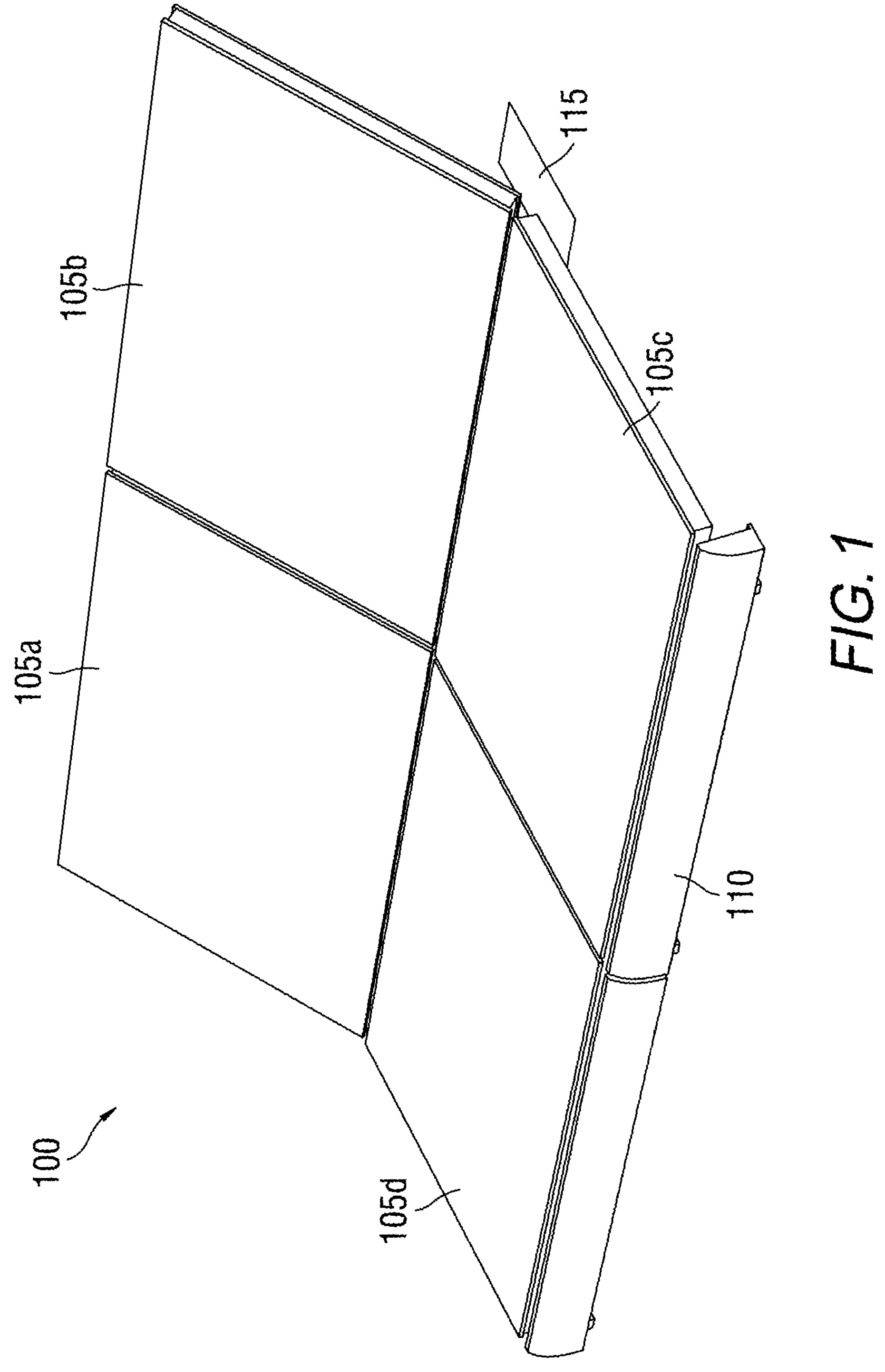
FIG. 1 depicts an exemplary perspective view of a solar panel system according to one or more aspects of the disclosed subject matter.

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed subject matter. However, it will be apparent to those skilled in the art that embodiments may be practiced without these specific details. In some instances, well-known structures and components may be shown in block diagram form in order to avoid obscuring the concepts of the disclosed subject matter.

Reference throughout the specification to "one embodiment" or "an embodiment" means that a particular feature, structure, characteristic, operation, or function described in connection with an embodiment is included in at least one embodiment of the disclosed subject matter. Thus, any appearance of the phrases "in one embodiment" or "in an embodiment" in the specification is not necessarily referring to the same embodiment. Further, the particular features, structures, characteristics, operations, or functions may be combined in any suitable manner in one or more embodiments. Further, it is intended that embodiments of the disclosed subject matter can and do cover modifications and variations of the described embodiments.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein, merely describe points of reference and do not necessarily limit embodiments of the disclosed subject matter to any particular orientation or configuration. Furthermore, terms such as "first," "second," "third," etc., merely identify one of a number of portions, components, points of reference, operations and/or functions as described herein, and likewise do not necessarily limit embodiments of the disclosed subject matter to any particular configuration or orientation.

Referring now to the drawings, wherein like reference numerals designate identical or corresponding parts throughout the several views.

FIG. 1 depicts an exemplary perspective view of a solar panel system (herein referred to as system 100) according to one or more aspects of the disclosed subject matter. The system 100 can include one or more solar panels (e.g., solar panels 105*a*-105*d*), one or more skirts 110, and one or more system mounts 115. The system 100 can be configured to be installed by securing the skirt 110 to a roof on which the system 100 is being installed and attaching a solar panel (e.g., solar panel 105*c*) to the skirt 110. Additionally, another solar panel (e.g., solar panel 105*b*) can be attached to the solar panel (e.g., 105*c*) that was previously attached to the skirt 110 via the system mount 115. Further, each solar panel 105*a*-105*d* installed can be configured to receive an additional solar panel to increase the size of the solar panel array of the system 100. For example, solar panel 105*b* can be attached to solar panel 105*c*. An additional skirt 110 can also be positioned next to the previously installed skirt 110. More specifically, the additional skirt 110 can be placed in line with the previously installed skirt 110 to effectively create a longer skirt configured to align the array of solar panels 105*a*-105*d* as the size of the system 100 increases. The precise alignment provided by the skirts 110 allows for each additional solar panel to be installed in the correct position. For example, if an additional skirt 110 is not in line with a previously installed skirt 110, the solar panels attached to each skirt (e.g., solar panels 105*c* and 105*d*) may not be positioned correctly to be coupled to an adjacent solar panel (e.g., solar panels 105*a* and 105*b*), as further described herein.

Figure 2:
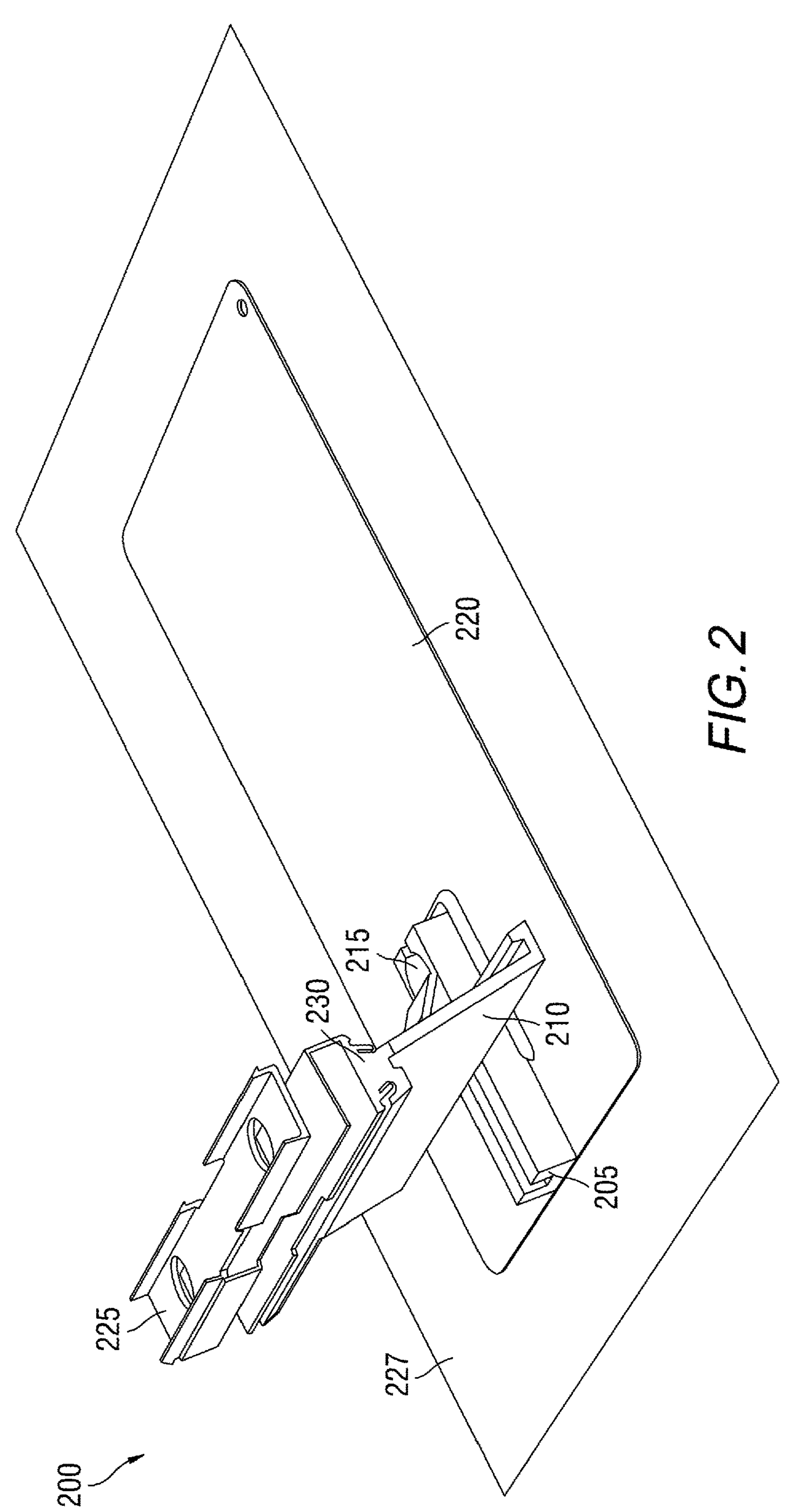
FIG. 2 depicts an exemplary perspective view of a system mount according to one or more aspects of the disclosed subject matter.

FIG. 2 depicts an exemplary perspective view of a system mount 200 according to one or more aspects of the disclosed subject matter. The system mount 200 can include a slotted lock 205, a mounting flange 210, a fastener opening 215, flashing 220, and a 5-clip 225. The slotted lock 205 can allow the mounting flange 210 to move a predetermined amount parallel to the flashing 220. The adjustment allowed by the slotted lock 205 can assist in the installation of the system 100. The slotted lock 205 can allow the system mount 200 to be moved up and down the roof 227 to which the system mount 200 is being attached. As a result, the solar panels can maintain a parallel array with respect to a roof ridge or eave, for example. The 5-clip 225 can connect to the solar panel (e.g., any of solar panels 105*a*-105*d*) via ridges in the frame of the solar panel. The 5-clip 225 can be connected to the mounting flange 210 via a block 230 built into the mounting flange 210 that can attach to a lower portion of the 5-clip 225. The block 230 can grip a bottom of the solar panel frame to which the 5-clip 225 is being attached. The combination of the 5-clip 225 and the mounting flange 210 can be used to connect an additional solar panel (e.g., solar panel 105*b*) to the previously installed solar panel (e.g., solar panel 105*c*), and the mounting flange 210 can be secured to the flashing 220 via the fastener opening 215 (e.g., via a lag bolt). The mounting flange 210 can provide structural attachment between the solar panels (e.g., between solar panel 105*a* and solar panel 105*b*) of the array of solar panels in the system 100. Additionally, the mounting flange 210 can provide structural attachment between each solar panel (e.g., solar panels 105*a*-105*d*) and the roof to which the solar panels are attached. The system mount 200 can snap into place based on the design of the 5-clip 225 in combination with the solar panel (e.g., solar panels 105*a*-105*d*) that can be configured to connect with the system mount 200 via the 5-clip 225, and the system mount 200 can be secured to the corresponding solar panel with a fastener (e.g., nut and bolt). The mounting flange 210 can be secured via a clamp (e.g., claw type clamp, strap type clamp, and the like). The clamp can be secured by a nut and bolt combination, for example, as show in FIG. 3 and/or FIG. 4.

Figure 3:
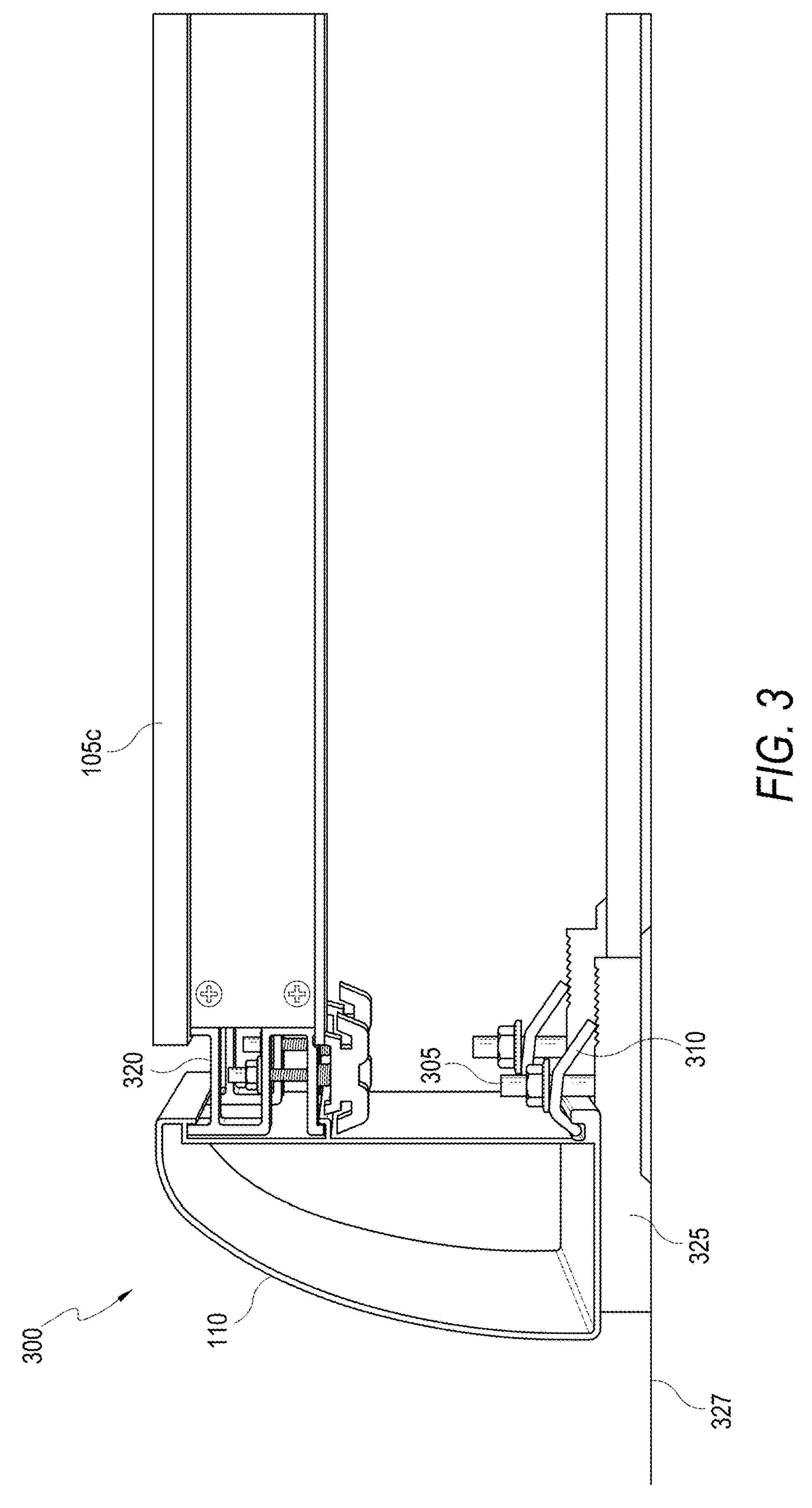
FIG. 3 depicts a side view of a skirt interface according to one or more aspects of the disclosed subject matter.

FIG. 3 depicts a side view of a skirt interface 300 according to one or more aspects of the disclosed subject matter. The skirt interface 300 can include a skirt 315, a solar panel (e.g., solar panel 105*c*), a 5-clip 320, and flashing 325. The skirt interface 300 can connect the solar panel 105*c* to the skirt 110. The skirt 110 can include a mounting flange designed as part of the skirt 110. The skirt 110 can be attached to the flashing 325 via a clamp 310 (e.g., claw type clamp, strap type clamp, etc.) secured via a nut and bolt combination 305. The skirt 110 can be an alignment skirt secured to the roof 327 as a first step of installing the system 100. The skirt 110 can be configured to receive the 5-clip 320 at a top portion of the skirt 110. The solar panel 105*c*, for example, can then be installed by integrating the solar panel 105*c* with the 5-clip 320. Integrating the solar panel 105*c* with the 5-clip 320 can be performed via a predetermined installation technique further described herein.

Figure 4:
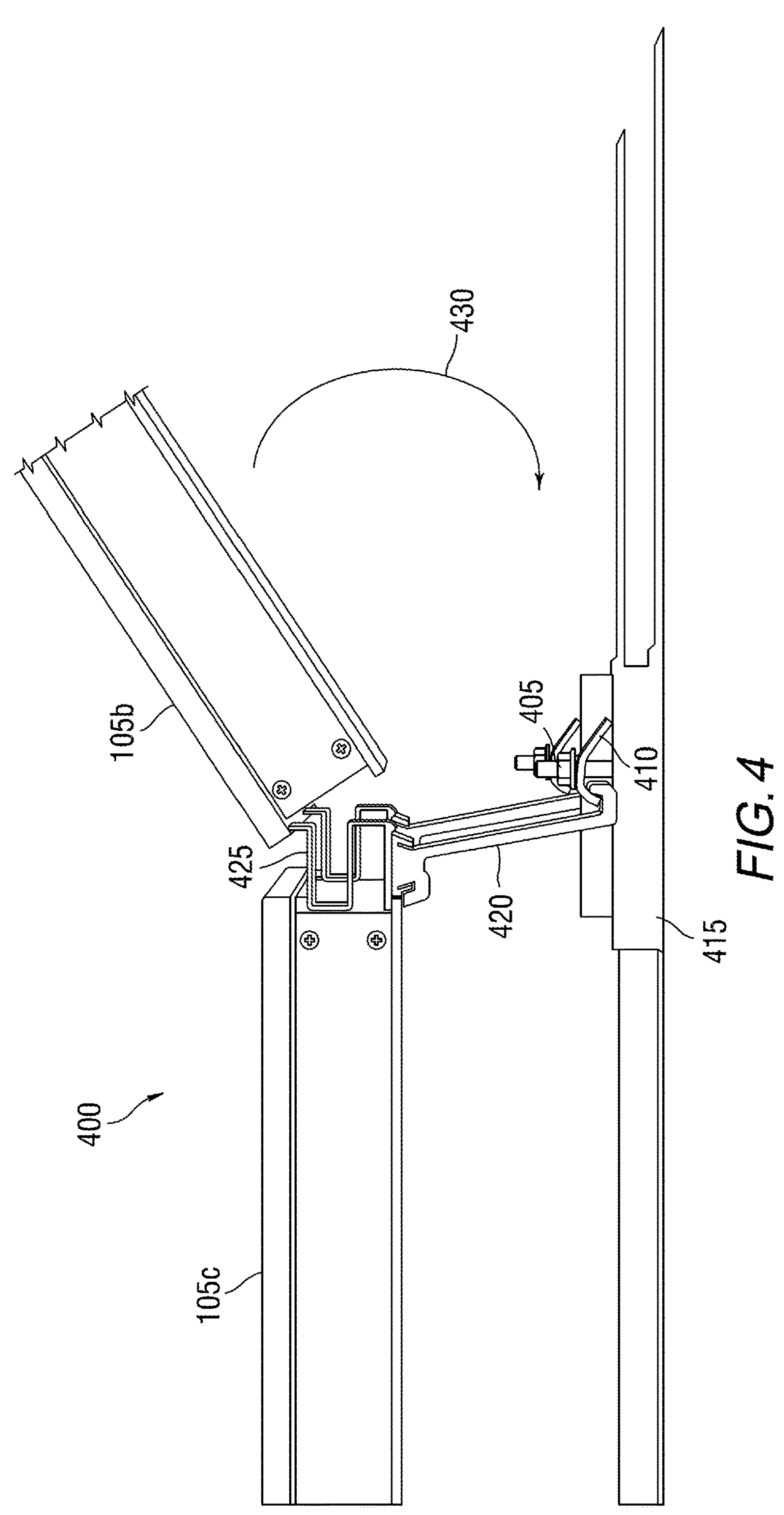
FIG. 4 depicts a mount interface according to one or more aspects of the disclosed subject matter.

FIG. 4 depicts a mount interface 400 according to one or more aspects of the disclosed subject matter. The mount interface 400 can include solar panel 105*c*, a nut and bolt combination 405, a clamp 410, flashing 415, mounting flange 420, and 5-clip 425. The solar panel 105*c* can be connected to a system mount where the mounting flange 420 can provide structural attachment between the solar panel 105*c* and the roof via the 5-clip 425 connecting the solar panel 105*c* and the mounting flange 420, while the mounting flange 420 is clamped to the flashing 415 and secured to the roof via the clamp 410 and the nut and bolt combination 405. Once the solar panel 105*c* is installed, thereby creating the mount interface 400, the next solar panel (e.g., solar panel 105*b*) can be installed. For example, solar panel 105*b* can be installed starting at an angle as depicted in FIG. 4. The angle to begin the installation can be a predetermine range of angles such that a portion of the 5-clip catches a lip of the solar panel 105*b*, for example. The solar panel 105*b* can then be lowered while the lip of the solar panel 105*b* connected to the 5-clip 425 creates a hinge-like motion as shown by installation technique 430. Once the solar panel 105*b* is lowered to be parallel with the solar panel 105*c*, the solar panel 105*b* can receive a system mount to provide structural attachment between the solar panel 105*b* and the roof, which also allows the solar panel 105*b* to include a mount interface that can receive an additional solar panel.

Figure 5:
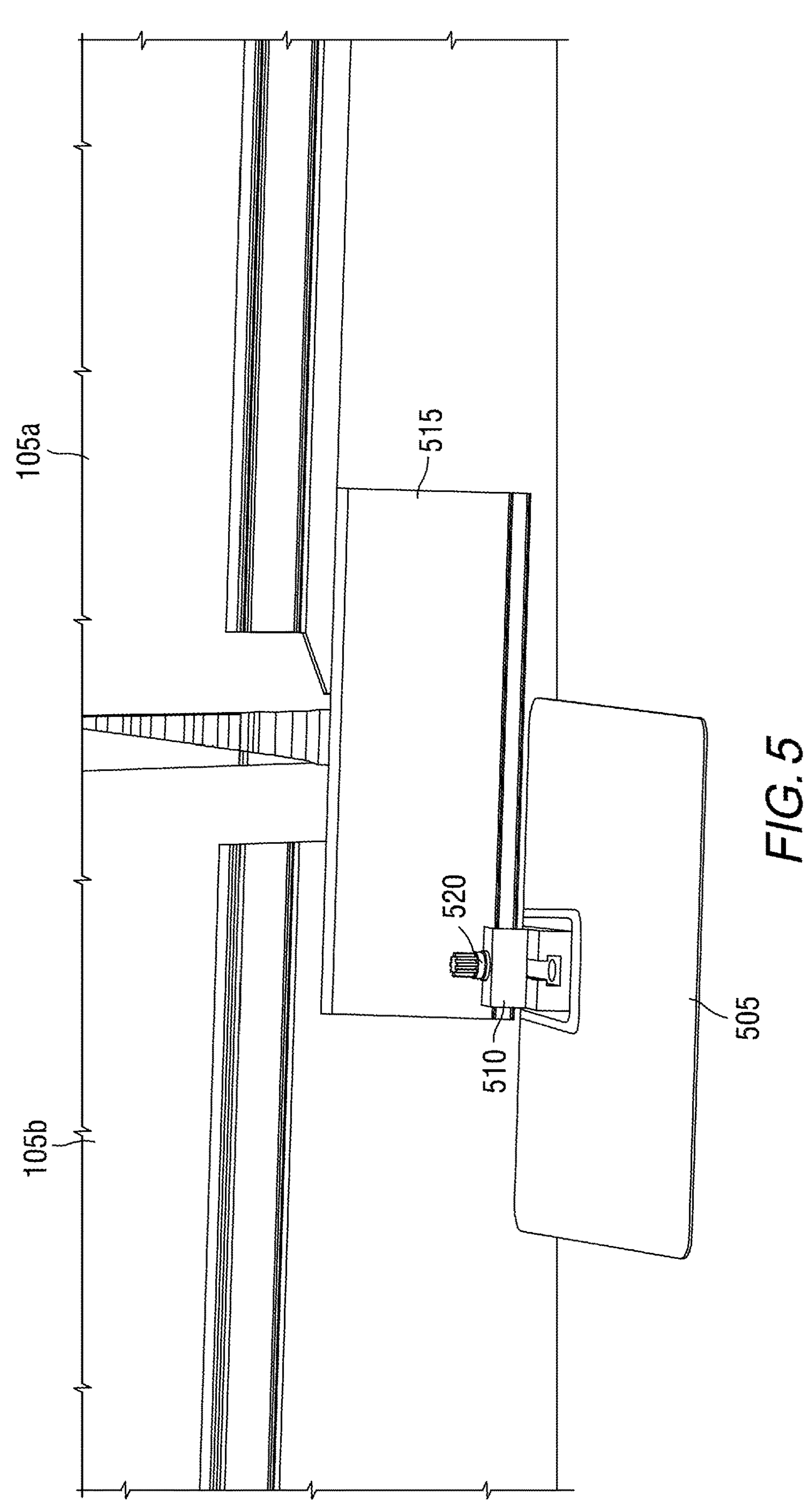
FIG. 5 depicts a panel to panel connection according to one or more aspects of the disclosed subject matter.

FIG. 5 depicts a solar panel to solar panel connection in a row of solar panels (e.g., solar panel 105*a* and solar panel 105*b*) according to one or more aspects of the disclosed subject matter. The mounting flange 515 may provide structural attachment between solar panels (e.g., the solar panel 105*a* and the solar panel 105*b*). As a result, the size of the system 100 can increase in length (e.g., attaching solar panel

105*b* to solar panel 105*c*) and width (e.g., adding solar panel 105*a* to solar panel 105*b*). Because the mounting flange 515 (which may be considered a splicing component, for example, in addition to supporting the solar panels) can provide structural attachment between solar panels, the number of system mounts 200 can be reduced, for example. In other words, the mounting flange 515 (via the mounting interface as described in FIG. 4, for example) can be a roof attachment and splicing component in one. The mounting flange 515 can be secured to the flashing, and therefore the roof, via a clamp 510 (e.g., claw type clamp, strap type clamp, and the like) and a nut and bolt combination 520. In an embodiment, the mounting flange can include two 5-clips 225 so the mounting flange 210 can connect to each solar panel (i.e., as a splicing component), for example.

Figure 6:
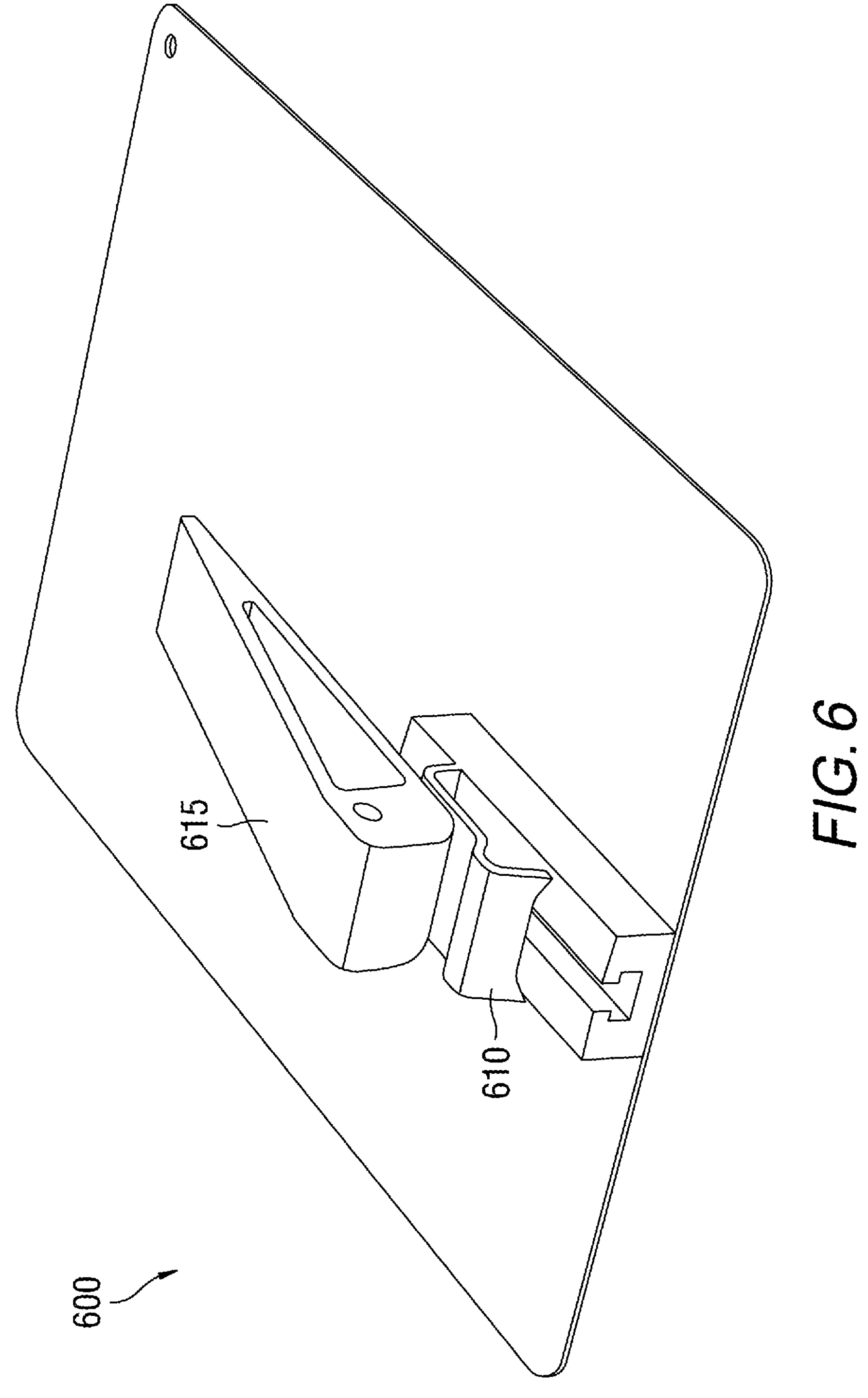
FIG. 6 depicts a clamping mechanism according to one or more aspects of the disclosed subject matter.

FIG. 6 depicts a clamping mechanism according to one or more aspects of the disclosed subject matter. In an embodiment, the clamp 610 can be secured with a cam lever 615 so that no tool is needed to clamp down the mounting flange (e.g., mounting flange 210, mounting flange 515, etc.). For example, installation could be performed by stepping on the cam lever 615, thereby reducing installation time. The cam lever 615 can be used anywhere there is a flange. Reducing installation time can reduce cost. Additionally, cost can be further reduced because no tools are needed to clamp down the mounting flange.

Figure 7:
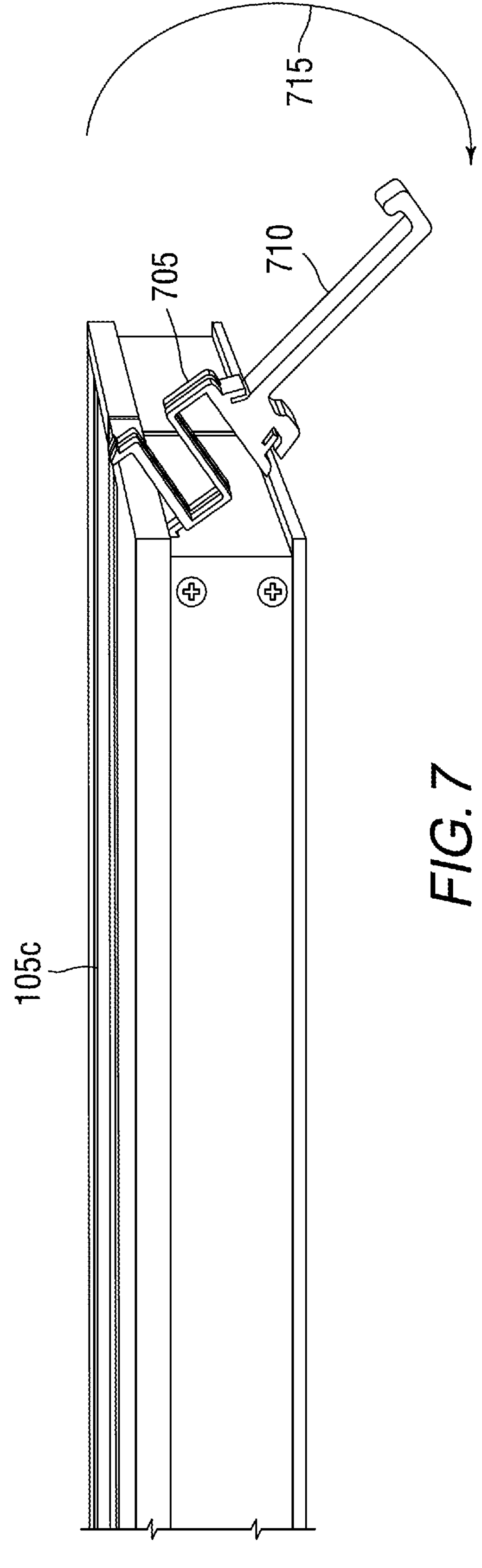
FIG. 7 depicts a portion of a mount interface snapping into place according to one or more aspects of the disclosed subject matter.

FIG. 7 depicts a portion of a mount interface snapping into place according to one or more aspects of the disclosed subject matter. The portion of the mount interface can include a 5-clip 705 and a mounting flange 710. It should be appreciated that the 5-clip 705 and the mounting flange 710 may be one component. The 5-clip 705 and mounting flange 710 can be snapped into place. The 5-clip 705 may be placed in a starting position as shown in FIG. 7 and then snapped into place via an installation technique 715 where the portion of the 5-clip 705 in contact with the solar panel (e.g., solar panel 105*c*) can allow the portion of the mount interface to move with a hinge like motion such that a predetermined portion of the portion of the mount interface can snap onto a bottom lip of the solar panel to which the portion of the mount interface is connecting (e.g., solar panel 105*c*). The mounting flange 710 can then be further secured to create the mount interface as described in FIG. 4, for example.

Figure 8:
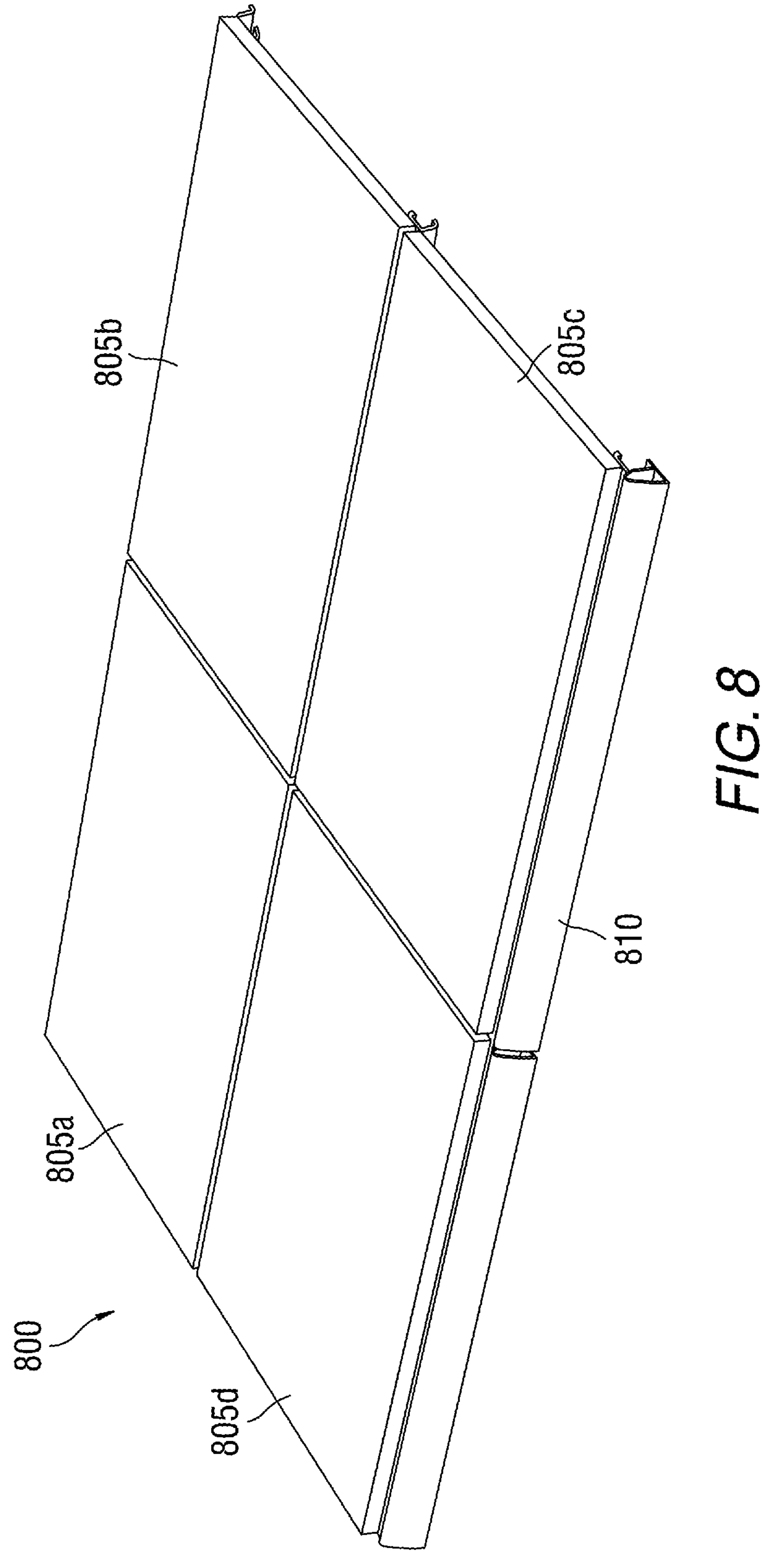
FIG. 8 depicts a perspective view of a solar panel system according to one or more aspects of the disclosed subject matter.

FIG. 8 depicts a perspective view of a solar panel system 800 (herein referred to as system 800) according to one or more aspects of the disclosed subject matter. The system 800 can include one or more solar panels (e.g., solar panels 805*a*-805*d*) and one or more skirts 810. The system 800 can include a mounting system fully integrated into each module. The mounting system can utilize production stamped or rolled sheet metal brackets and flanges, for example, to mount an array of solar panels. Additionally, the solar panels (e.g., solar panels 805*a*-805*d*) can be designed to be stored and shipped in a stack. In other words, each solar panel can be designed to stack conveniently to save space and improve transportation of the solar panels. Because the solar panels can include a mounting system fully integrated into each module, determining installation bills of material (BOM) can be less site specific, as well as streamlining shipping and logistics challenges. The integrated mounting system can include a flange and a set of hooks that can be attached to the edges of a solar panel (e.g., connecting solar panel 805*b* to solar panel 805*c*). The flange can provide a mounting offset from the roof surface, and an interface to which anchor points can be attached. The hooks can interface with the flange of the previous row, thus transferring the load of the free end of the module to the flange of the previous row. The system 800 can include a first structural rail (e.g., skirt 110) along the front edge of the array. From there, the front hooks of a solar panel (e.g., solar panel 805*c*) can be clipped in and the flange can be secured along a back edge to structural mounts. In order to reduce the number of structural mounts required, splicing brackets can be used to bridge the flanges of a row of modules to each other. Positional tolerance can be an important aspect of the system 800. The system 800 can allow the installer flexibility through play in the hook-flange interface as well as sizing and frequency of the mounting holes along the lower edge of the flange. Punch outs in the flange can allow for wire to be passed through and connected after solar panels are fastened in place.

Figure 9:
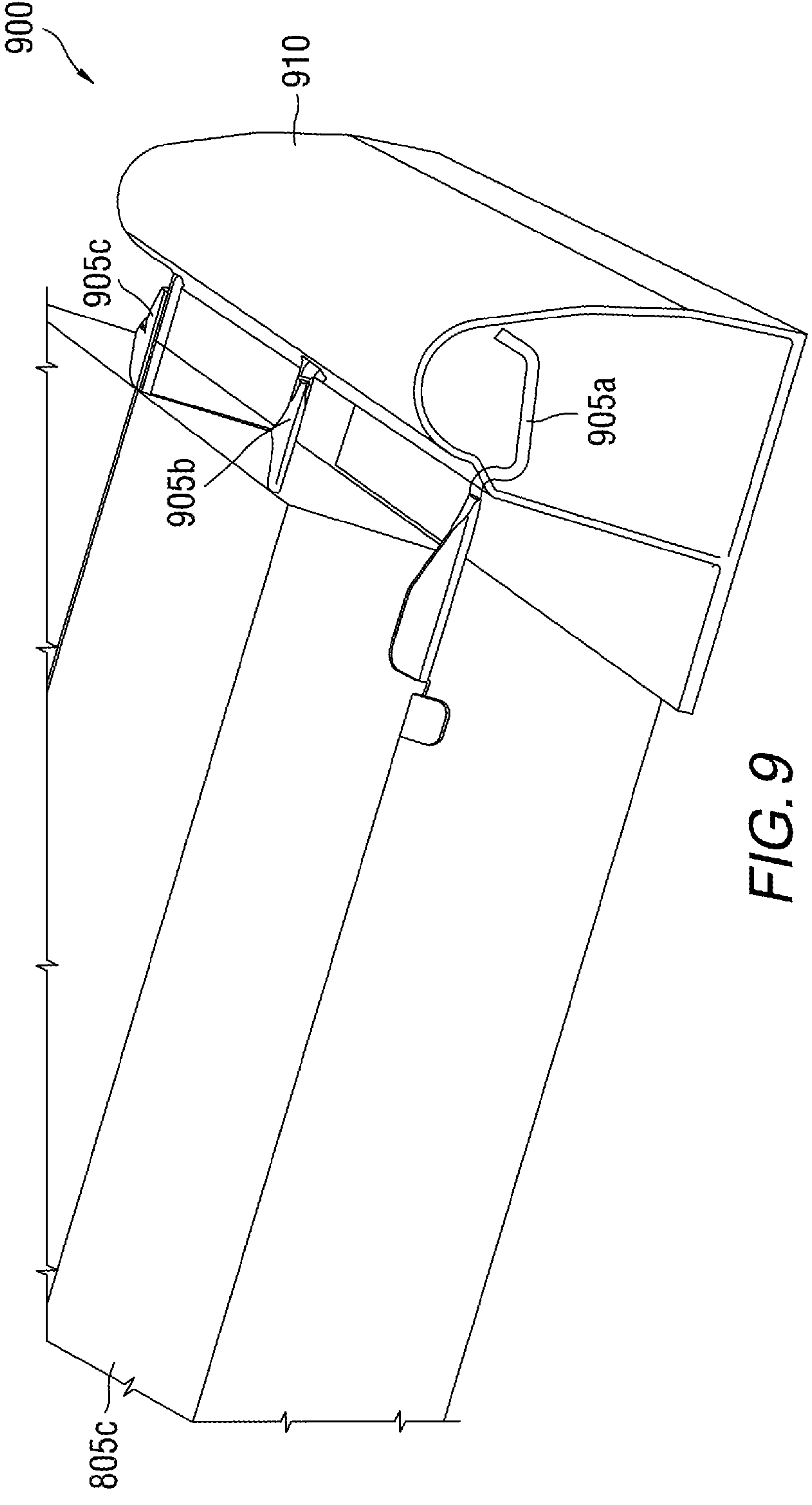
FIG. 9 depicts a perspective view of a skirt interface according to one or more aspects of the disclosed subject matter.

FIG. 9 depicts a perspective view of a skirt interface 900 according to one or more aspects of the disclosed subject matter. The skirt interface 900 can include a solar panel (e.g., solar panel 805*c*), one or more hooks (e.g., hooks 905*a*-905*c*), and a skirt 910. The skirt 910 can receive the one or more hooks 905*a*-905*c*, thereby securing the solar panel 805*c* to the skirt 110.

Figure 10:
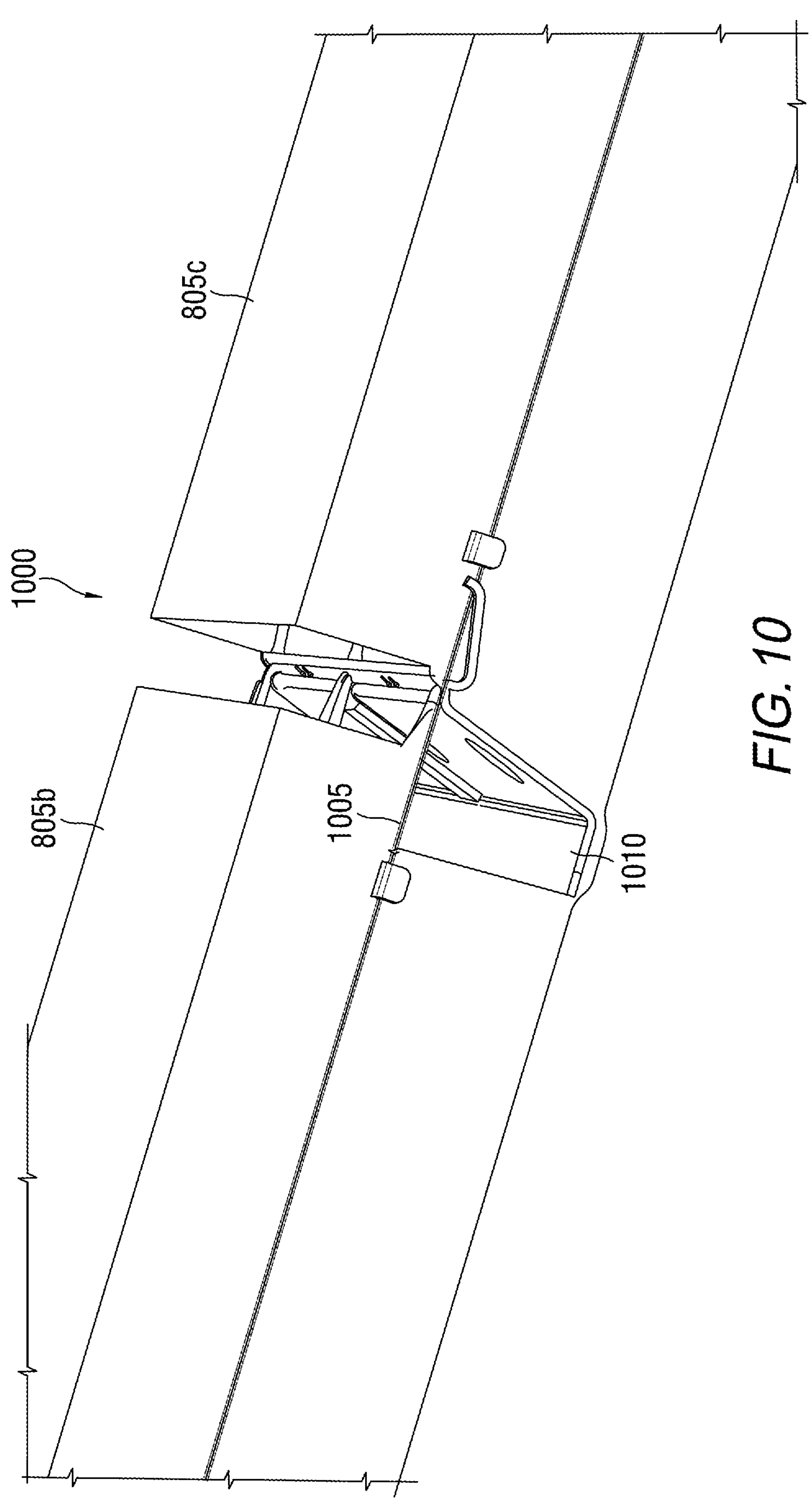
FIG. 10 depicts a mount interface according to one or more aspects of the disclosed subject matter.

FIG. 10 depicts a mount interface 1000 according to one or more aspects of the disclosed subject matter. The mount interface 1000 can include one or more hooks 1005 and one or more flanges 1010. The one or more hooks 1005 may be integrated into the solar panel being added to the system 800 (e.g., solar panel 805*b*). The one or more hooks 1005 may be placed through one or more flanges 1010 where the one or more flanges may have been previously fully integrated into each solar panel such that they are already correctly positioned to receive the one or more hooks 1005 after the solar panel (e.g., solar panel 805*c*) has been installed. The flange 1010 may provide a mounting offset from the roof surface and an interface through which the hooks 1005 can integrate. The hooks 1005 may integrate with the flange 1010 of the solar panel (e.g., solar panel 805*c*) which may assist in supporting the weight of the solar panel being installed (e.g., solar panel 805*b*).

Figure 11:
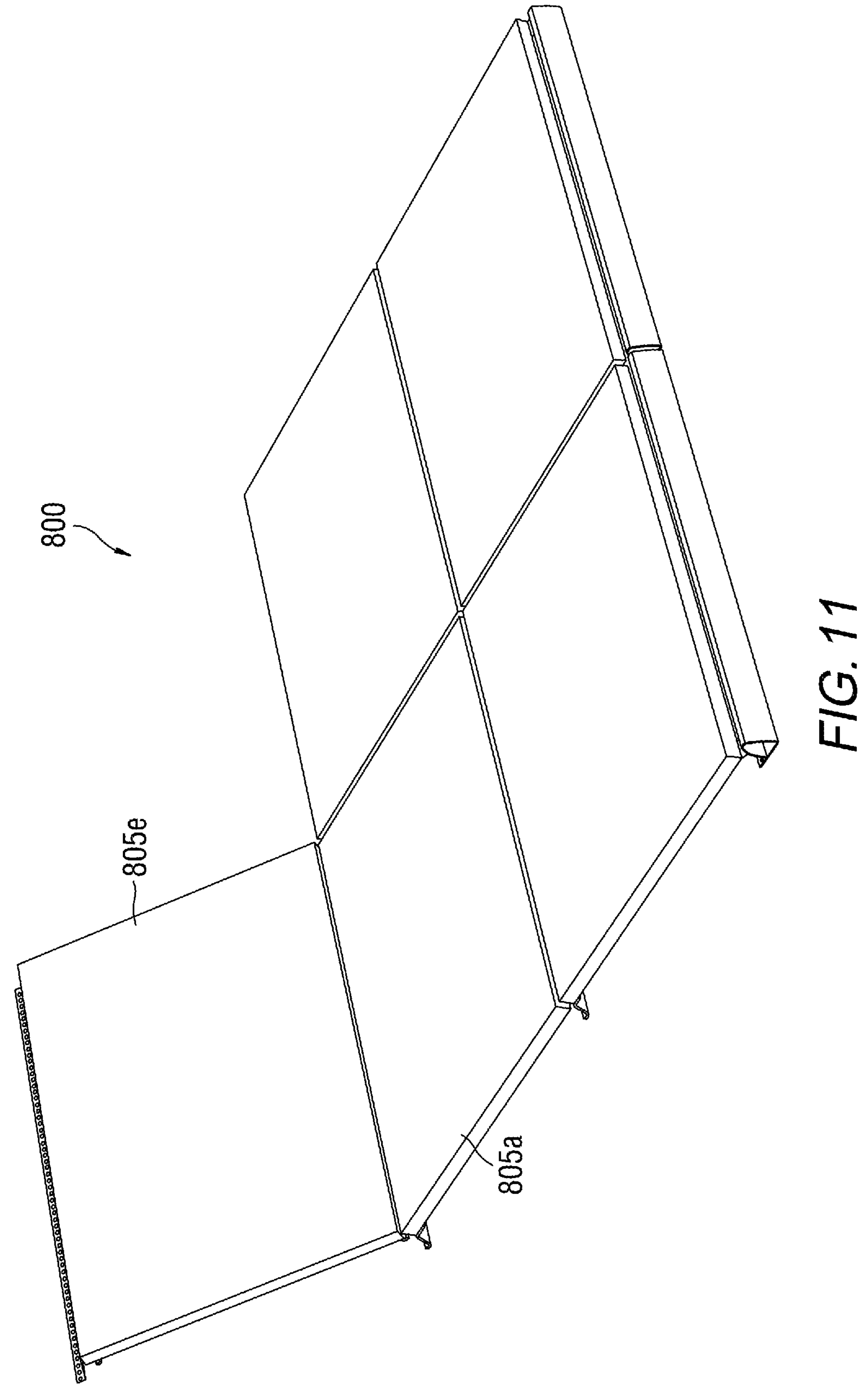
FIG. 11 depicts an exemplary solar panel attachment technique according to one or more aspects of the disclosed subject matter.
Figure 12:
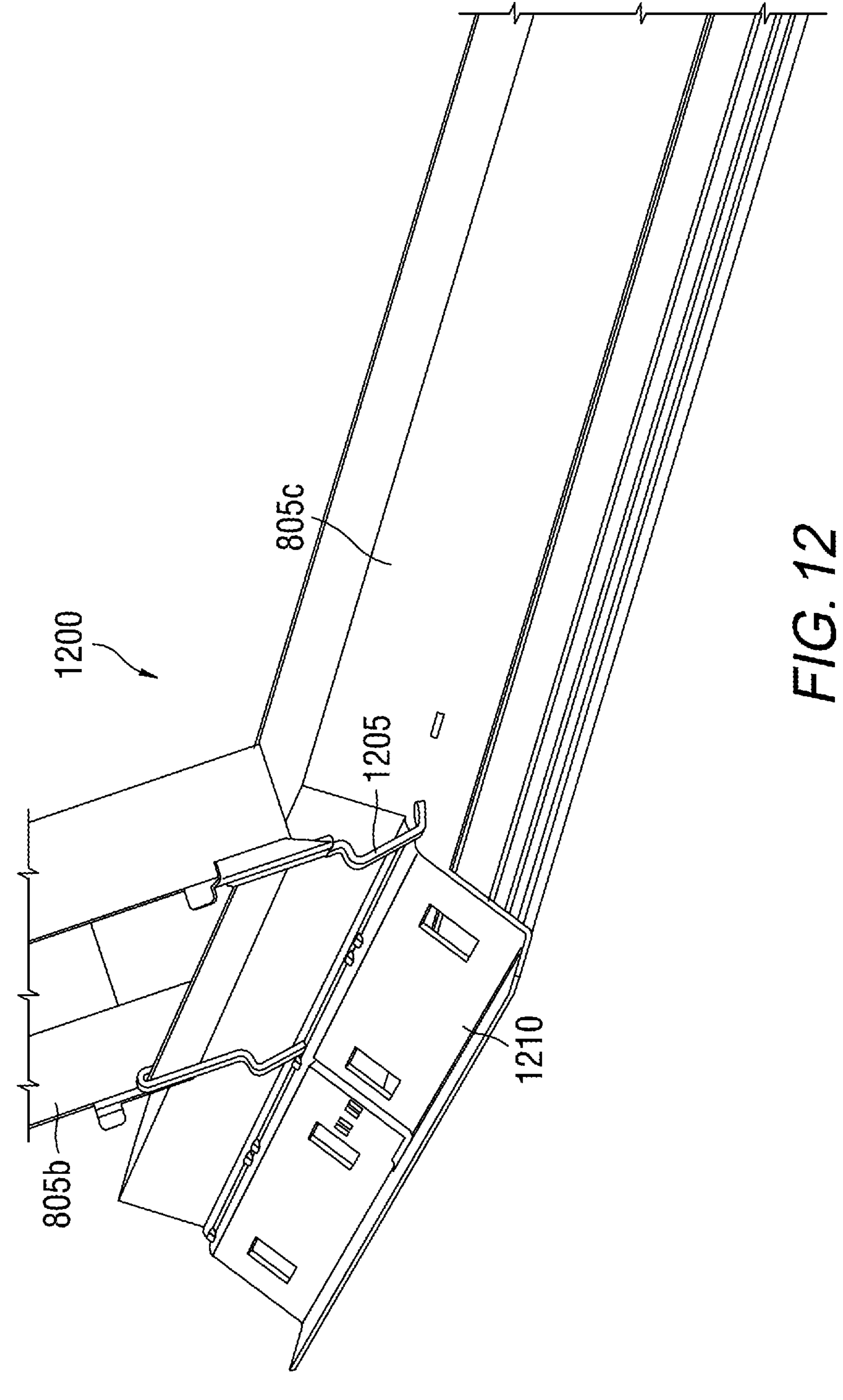
FIG. 12 depicts an exemplary solar panel attachment technique according to one or more aspects of the disclosed subject matter.

FIG. 11 and FIG. 12 depict different perspectives of an exemplary solar panel attachment technique according to one or more aspects of the disclosed subject matter. FIG. 11 is a perspective from above the system 800 and shows how each solar panel may be attached to another solar panel in the array to create the system 800. For example, FIG. 11 depicts a starting position for installation of solar panel 805*e*. The angle of the solar panel 805*e* may allow the one or more hooks integrated into the solar panel 805*e* (e.g., hooks 1005) may integrate with the one or more skirts integrated into the solar panel 805*a* (e.g., skirts 1010). Although the solar panels on the end of the system 800 with the one or more skirts may have the hooks integrated into each solar panel integrate with the skirt, additional solar panels installed to increase the size of the array can integrate with the flanges integrated into each solar panel.

FIG. 12 shows a hook and flange interface 1200 such that the hooks from the solar panel being installed may be connected to the one or more flanges of the previously installed solar panel such that connecting a plurality of solar panels forms an array of solar panels as the system 100. The hook and flange interface 1200 can include one or more hooks 1205 and one or more flanges 1210 connecting two solar panels (e.g., connecting solar panel 805*b* to solar panel 805*c*). The hooks 1205 of the solar panel being installed (e.g., solar panel 805*b*) can be integrated with the flange 1210 of the solar panel that has already been installed (e.g., solar panel 805*c*) as similarly described in FIG. 10. The hooks 1205 may be installed at an angle within a predetermined range of angles for the hooks 1205 to interface with the flange 1210.

Figure 13:
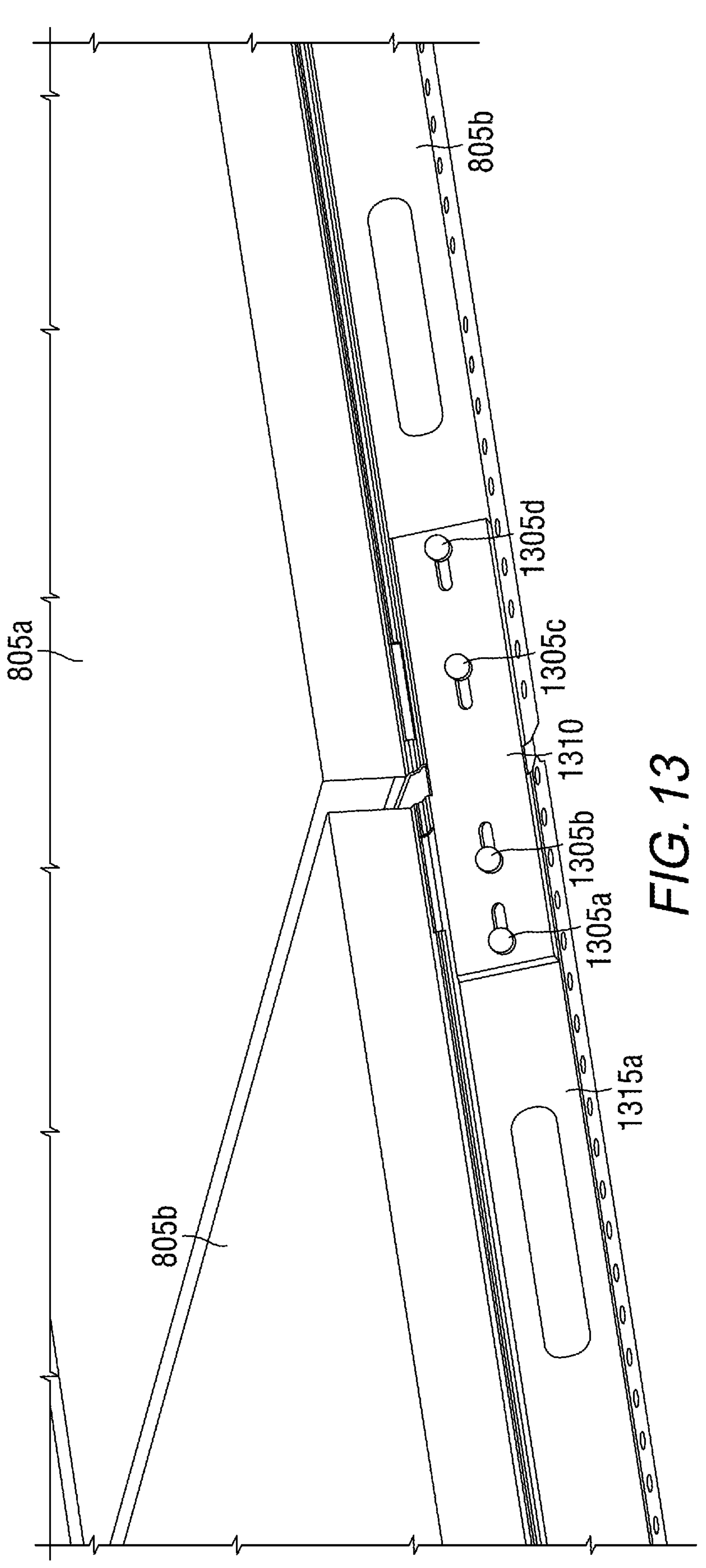
FIG. 13 depicts an exemplary splicing technique according to one or more aspects of the disclosed subject matter.

FIG. 13 depicts an exemplary splicing technique according to one or more aspects of the disclosed subject matter. In order to reduce the number of structural mounts, a splicing bracket 1310 may be used to bridge the flanges (e.g., flange 1315*a* corresponding to solar panel 805*a* and flange 1315*b* corresponding to solar panel 805*a*) of a row of solar panels together. The splicing bracket 1310 may be secured by fasteners 1305*a*-1305*d*, for example, where fasteners 1305*a*-1305*d* may be self-drilling screws.

Figure 14:
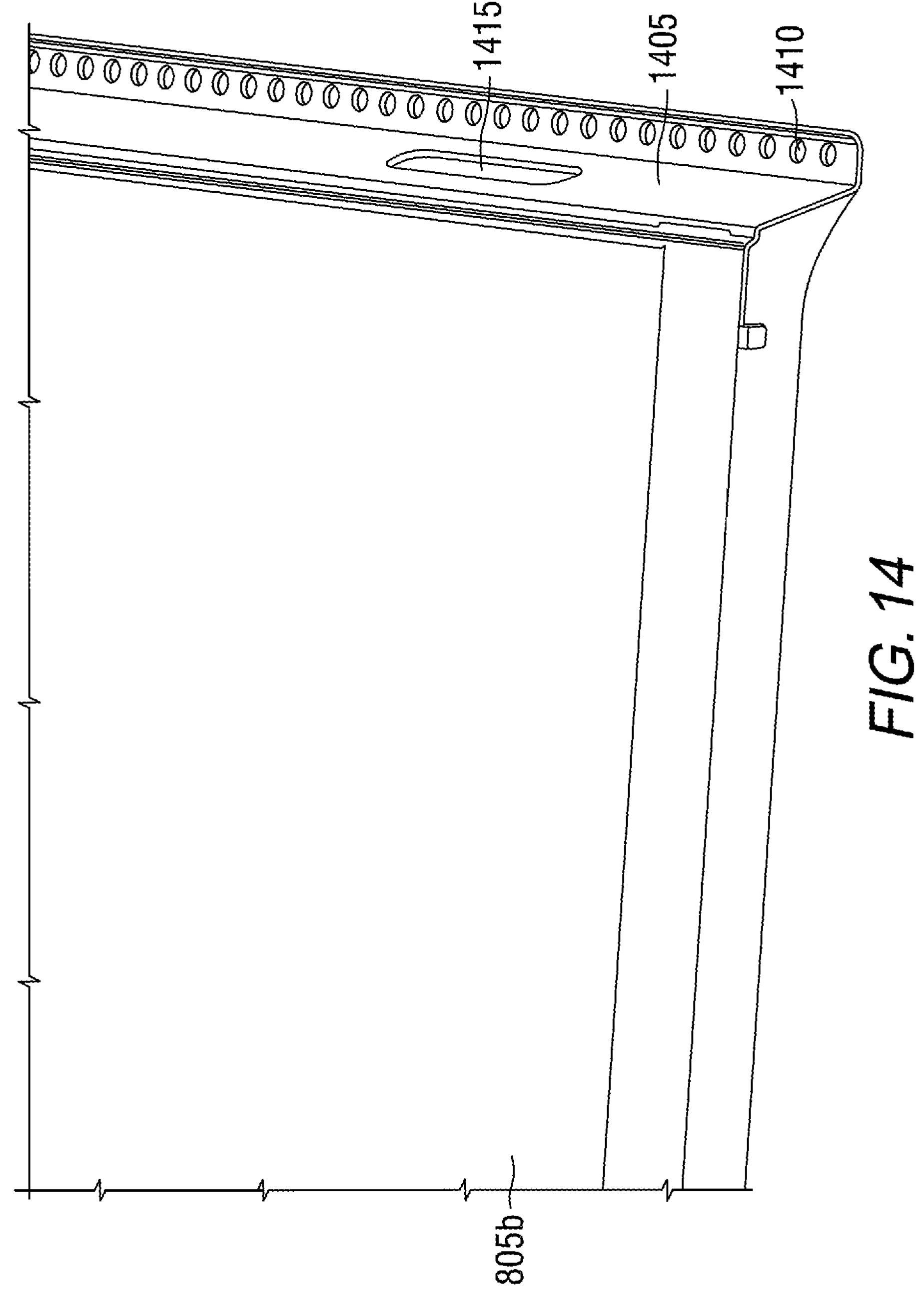
FIG. 14 depicts an exemplary mounting edge of a solar panel according to one or more aspects of the disclosed subject matter.

FIG. 14 depicts an exemplary mounting edge of a solar panel according to one or more aspects of the disclosed subject matter. The flange 1405 can be secured to the roof via one or more mounting holes 1410 along a lower edge of the flange 1405. Positional tolerance can be an important aspect of the installing the system 800. The sizing and frequency of the mounting holes 1410 can allow flexibility during installation. Additionally, punch outs 1415 may allow for wire to be passed through and connected after solar panels (e.g., solar panel 805*b*) are fastened in place.

Figure 15:
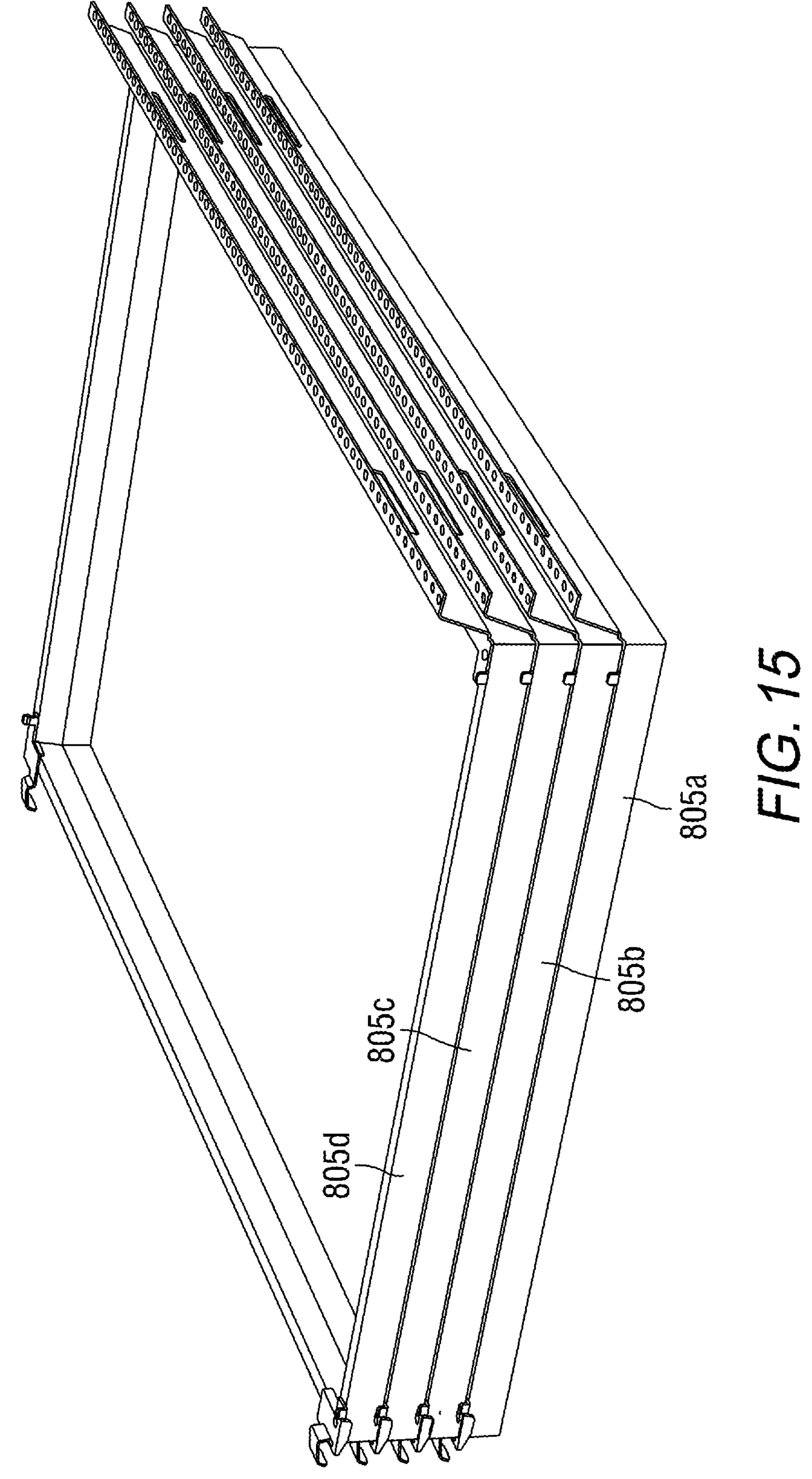
FIG. 15 depicts stacked solar panels according to one or more aspects of the disclosed subject matter.

FIG. 15 depicts stacked solar panels (e.g., solar panels 805*a*-805*d*) according to one or more aspects of the disclosed subject matter. The solar panels may be stacked conveniently for storage, shipping, and the like.

Figure 16:
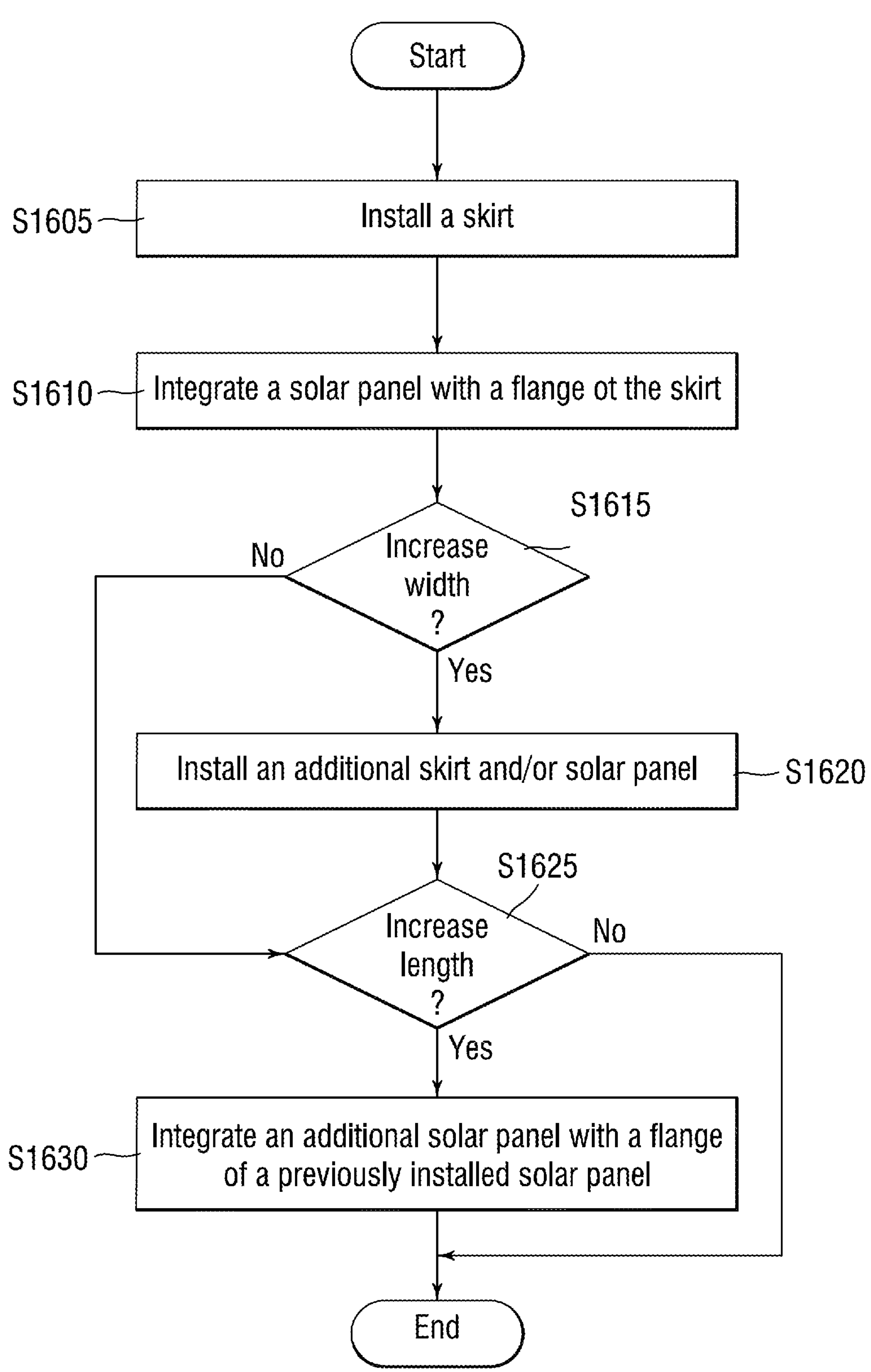
FIG. 16 is an exemplary workflow for installing a solar panel system according to one or more aspects of the disclosed subject matter.

FIG. 16 is an exemplary workflow for installing a solar panel system (e.g., system 100 and/or system 800).

In S1605, a skirt (e.g., skirt 110 and/or skirt 810) can be installed. The skirt can be placed in a predetermined location on a roof a residential building, for example. The skirt can assist in aligning the each solar panel installed in the system.

In S1610, a solar panel (e.g., solar panel 105*c* and/or 805*c*) can be integrated with a flange of the skirt. The solar panel may be integrated with a flange of the skirt via skirt interface 300 and/or skirt interface 900, for example.

In S1615, it can be determined if the width of the solar panel system will be increased, as determined by a pre-drawn plan based on the intended design of the solar panel system, for example. The design of the solar panel system may be based on available roof space, location of the home, weather in the area, and the like. If it is determined that the width will be increased, an additional skirt and/or solar panel can be installed. The additional skirt may be bridged with the previously installed skirt (e.g., via splicing bracket 1310 and/or mounting flange 515). The additional solar panel may similarly be bridged via splicing bracket 1310 and/or mounting flange 515. For example, if only one skirt has been installed, increasing the width may require installing another skirt and then an additional solar panel integrated into that skirt. Alternatively, if the width of the system is being increased and there is already a skirt and one or more solar panels installed in the column, the additional solar panel may be installed in the previously installed solar panel, which may increase the length of the corresponding column and the width of the row. However, if it is determined that the width is not being increased, it can be determined if the length will be increased in S1625.

In S1625, it can be determined if the length of the solar panel system will be increased. If it is determined that the length will not be increased, the process can end. However, if it is determined that the length of the solar panel system will be increased, an additional solar panel can be integrated with a flange of a previously installed solar panel (e.g., adding solar panel 105*b* to solar panel 105*c* and/or adding solar panel 805*b* to solar panel 805*c*). The solar panel may be installed via a mount interface (e.g., mount interface 400 and/or mount interface 1000) to increase a length of the system. After the length is increased, the process can end. It should be appreciated that steps of the workflow may be performed simultaneous, in a different order, and/or repeated to complete an installation of the solar panel system.

It should be appreciated that each solar panel system (e.g., system 100, system 800) can include any number of solar panels and the solar panels (e.g., 105*a*-105*d* and 805*a*-805*e*) are used as an example to depict how a plurality of solar panels may be installed and connected.

It should be appreciated that components and techniques of each of system 100 and system 800 may be interchangeable and/or components from each system may be added to the other system.

The solar panel system (e.g., system 100 and system 800) has several advantages that include reducing cost and improving the ease and speed of installation, thereby further reducing cost. For example, reducing the amount of parts needed for installation can significantly reduce the bill of material (BOM), while additional reducing installation time. The amount of parts needed is easily reduced by fully integrating the mounting system into the solar panel, using a snap in mount interface, using the cam lever 600 to clamp a flange, and the like. In an embodiment, no tools are needed to install the solar panel system. These advantages are ideal for customers looking for bargain systems while still demanding the extended warranties of more premium systems because installation time and aesthetics are the most accessible areas to cut installed system costs. Additionally, the splicing brackets (e.g., splicing brackets 1310) can be used to bridge the flanges of a row of modules to each other in order to reduce the number of structural mounts required, thereby reducing cost and installation time. Similarly, the mounting flange 515 can bridge two solar panels. The solar panel system is also robust enough to meet building structural requirements, for example, and integrate seamlessly with existing home hardware. Additionally, the solar panel system is easy and intuitive to install. Further, the solar system can be mounted without rails which can significantly reduce time and cost of installation.

Having now described embodiments of the disclosed subject matter, it should be apparent to those skilled in the art that the foregoing is merely illustrative and not limiting, having been presented by way of example only. Thus, although particular configurations have been discussed herein, other configurations can also be employed. Numerous modifications and other embodiments (e.g., combinations, rearrangements, etc.) are enabled by the present disclosure and are within the scope of one of ordinary skill in the art and are contemplated as falling within the scope of the disclosed subject matter and any equivalents thereto. Features of the disclosed embodiments can be combined, rearranged, omitted, etc., within the scope of the invention to produce additional embodiments. Furthermore, certain features may sometimes be used to advantage without a corresponding use of other features. Accordingly, Applicant(s) intend(s) to embrace all such alternatives, modifications, equivalents, and variations that are within the spirit and scope of the disclosed subject matter.

The invention claimed is:

1. A method for mounting a solar panel system having a first solar panel and a second solar panel, the method comprising steps of:

installing a skirt to a roof by clamping a roof mounting flange, which protrudes from a lower end of the skirt, to the roof, the skirt including a panel mounting portion protruding from an upper end of the skirt;

snapping a first clip to the panel mounting portion of the skirt, wherein snapping the first clip to the panel mounting portion of the skirt includes:

engaging an upper edge of a lateral side of the first clip into an upper end of a rear side of the skirt;

engaging a lower edge of the lateral side of the first clip into a middle region of the rear side of the skirt;

engaging a protrusion, which extends upwardly at the upper edge of the lateral side of the first clip, within a first groove that extends along the upper end of the rear side of the skirt; and engaging a protrusion, which extends downwardly at the lower edge of the lateral side of the first clip, within a second groove that extends along the middle region of the rear side of the skirt;

snapping the first solar panel to the first clip to interconnect the first solar panel to the skirt;

snapping a second clip onto the first solar panel;

supporting the first solar panel, above the roof and at an end opposite the skirt, with a flange that extends between the second clip and the roof; and snapping the second solar panel to the second clip to interconnect the second solar panel to the first solar panel.

2. The method according to claim 1, wherein the step of snapping the first solar panel to the first clip includes:

engaging an upper edge of a lateral side of the first clip into an upper side edge of the first solar panel, and engaging a lower edge of the lateral side of the first clip into a lower side edge of the first solar panel.

3. The method according to claim 2, wherein the step of snapping the first solar panel to the first clip further includes:

engaging a protrusion, which extends upwardly at the upper edge of the lateral side of the first clip, within a first ridge in a frame that extends along the upper side edge of the first solar panel, and engaging a protrusion, which extends downwardly at the lower edge of the lateral side of the first clip, within a second ridge in the frame that extends along the lower side edge of the first solar panel.

4. The method according to claim 1, wherein the step of snapping the second clip onto the first solar panel includes:

engaging an upper edge of a lateral side of the second clip into an upper side edge of the first solar panel, the upper side edge being opposite a side of the first solar panel connected to the first clip, and engaging a lower edge of the lateral side of the second clip into a lower side edge of the first solar panel, the lower side edge also being opposite the side of the first solar panel connected to the first clip.

5. The method according to claim 4, wherein the step of snapping the second clip onto the first solar panel further includes:

engaging a protrusion, which extends upwardly at the upper edge of the lateral side of the second clip, within a first ridge in a frame that extends along the upper side edge of the first solar panel, and engaging a protrusion, which extends downwardly at the lower edge of the lateral side of the second clip, within a second ridge in the frame that extends along the lower side edge of the first solar panel.

6. The method according to claim 1, wherein the step of snapping the second solar panel to the second clip includes:

engaging an upper edge of a lateral side of the second clip into an upper side edge of the second solar panel, and engaging a lower edge of the lateral side of the second clip into a lower side edge of the second solar panel.

7. The method according to claim 6, wherein the step of snapping the second solar panel to the second clip further includes:

engaging a protrusion, which extends upwardly at the upper edge of the lateral side of the second clip, within a first ridge in a frame that extends along the upper side edge of the second solar panel, and engaging a protrusion, which extends downwardly at the lower edge of the lateral side of the second clip, within a second ridge in the frame that extends along the lower side edge of the second solar panel.

8. The method according to claim 1, wherein the flange is a first flange, and wherein the method further comprises supporting the second solar panel, above the roof and at an end opposite the first solar panel, with a second flange that extends between the second solar panel and the roof.

9. A method for mounting a solar panel system having a first solar panel and a second solar panel, the method comprising steps of:

installing a skirt to a roof by clamping a roof mounting flange, which protrudes from a lower end of the skirt, to the roof, the skirt including a panel mounting portion protruding from an upper end of the skirt;

connecting a first 5-clip to the panel mounting portion of the skirt, where a 5-clip is formed in a shape of number five, wherein connecting the first 5-clip to the panel mounting portion of the skirt includes:

engaging an upper edge of a lateral side of the first 5-clip into an upper end of a rear side of the skirt;

engaging a lower edge of the lateral side of the first 5-clip into a middle region of the rear side of the skirt;

engaging a protrusion, which extends upwardly at the upper edge of the lateral side of the first 5-clip, within a first groove that extends along the upper end of the rear side of the skirt; and engaging a protrusion, which extends downwardly at the lower edge of the lateral side of the first 5-clip, within a second groove that extends along the middle region of the rear side of the skirt;

connecting a first side of the first solar panel to the first 5-clip to interconnect the first solar panel to the skirt;

connecting a second 5-clip onto a second side of the first solar panel;

supporting the second side of the first solar panel with a flange that extends between the second 5-clip and the roof; and connecting a second solar panel to the second 5-clip to interconnect the second solar panel to the first solar panel.

10. The method according to claim 9, wherein the step of connecting the first solar panel to the first 5-clip includes:

engaging an upper edge of a lateral side of the first 5-clip into an upper side edge of the first solar panel, and engaging a lower edge of the lateral side of the first 5-clip into a lower side edge of the first solar panel.

11. The method according to claim 10, wherein the step of connecting the first solar panel to the first 5-clip further includes:

engaging a protrusion, which extends upwardly at the upper edge of the lateral side of the first 5-clip, within a first ridge in a frame that extends along the upper side edge of the first solar panel, and engaging a protrusion, which extends downwardly at the lower edge of the lateral side of the first 5-clip, within a second ridge in the frame that extends along the lower side edge of the first solar panel.

12. The method according to claim 9, wherein the step of connecting the second 5-clip onto the first solar panel includes:

engaging an upper edge of a lateral side of the second 5-clip into an upper side edge of the first solar panel, the upper side edge being opposite a side of the first solar panel connected to the first 5-clip, and engaging a lower edge of the lateral side of the second 5-clip into a lower side edge of the first solar panel, the lower side edge also being opposite the side of the first solar panel connected to the first 5-clip.

13. The method according to claim 12, wherein the step of connecting the second 5-clip onto the first solar panel further includes:

engaging a protrusion, which extends upwardly at the upper edge of the lateral side of the second 5-clip, within a first ridge in a frame that extends along the upper side edge of the first solar panel, and engaging a protrusion, which extends downwardly at the lower edge of the lateral side of the second 5-clip, within a second ridge in the frame that extends along the lower side edge of the first solar panel.

14. The method according to claim 9, wherein the step of connecting the second solar panel to the second 5-clip includes:

engaging an upper edge of a lateral side of the second 5-clip into an upper side edge of the second solar panel, and engaging a lower edge of the lateral side of the second 5-clip into a lower side edge of the second solar panel.

15. The method according to claim 14, wherein the step of connecting the second solar panel to the second 5-clip further includes:

engaging a protrusion, which extends upwardly at the upper edge of the lateral side of the second 5-clip, within a first ridge in a frame that extends along the upper side edge of the second solar panel, and engaging a protrusion, which extends downwardly at the lower edge of the lateral side of the second 5-clip, within a second ridge in the frame that extends along the lower side edge of the second solar panel.

16. The method according to claim 9, wherein the flange is a first flange, and wherein the method further comprises supporting the second solar panel, above the roof and at an end opposite the first solar panel, with a second flange that extends between the second solar panel and the roof.

* * * * *